Dec. 9, 1924.                                      1,518,160
P. V. O'HARA
MILK DIPPER
Filed Feb. 28, 1924
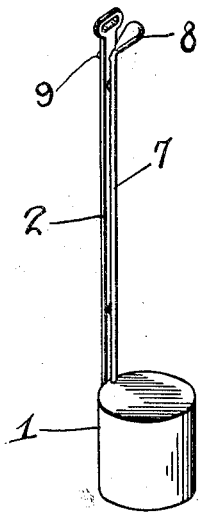
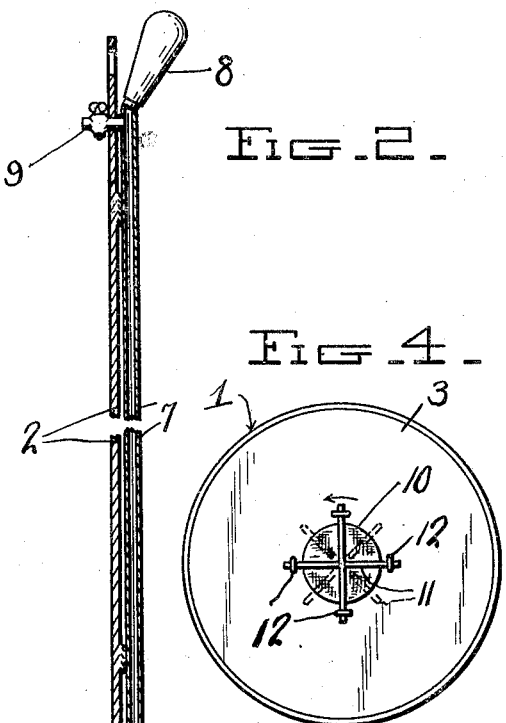
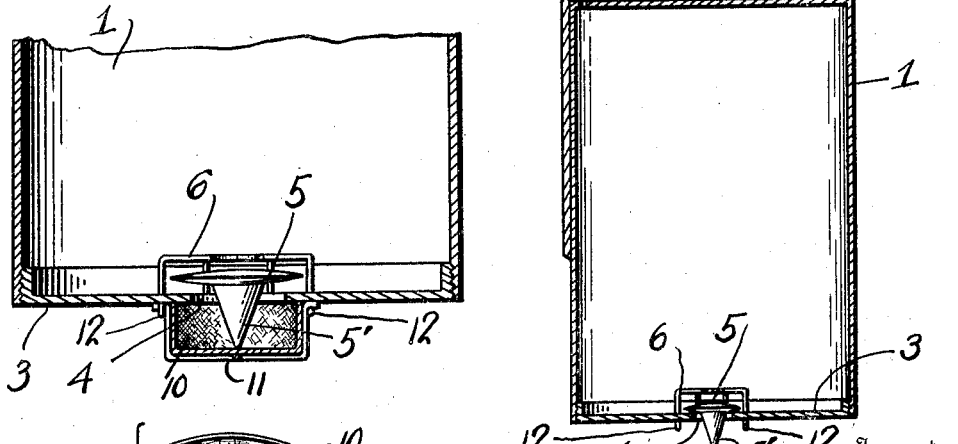
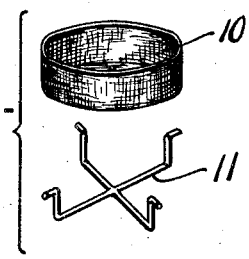
Inventor
Philip V. O'Hara
By L. B. James
Attorney Patented Dec. 9, 1924.

1,518,160

UNITED STATES PATENT OFFICE.

PHILIP V. O'HARA, OF ANN ARBOR, MICHIGAN.

MILK DIPPER.

Application filed February 28, 1924. Serial No. 695,658.

*To all whom it may concern:*

Be it known that I, PHILIP V. O'HARA, a citizen of the United States, residing at Ann Arbor, in the county of Washtenaw and State of Michigan, have invented new and useful Improvements in Milk Dippers, of which the following is a specification.

This invention relates to a device for removing a portion of a body of liquid from the lower part of a container for testing purposes. The device is mainly designed for use with milk where it is necessary to test the liquid near the bottom of the container in order to find out whether or not the milk contains impurities.

The principal object of the invention is to provide means for holding the milk in the device while the device is being drawn from the container and to provide means for forcing the milk from the device when desired.

Another object of the invention is to provide means for filtering the milk passing from the device so that a test can be made from the matter caught by the filtering medium and it is not necessary to test the milk itself.

A further object of the invention is to provide means for removably holding the filter over the outlet of the device so that it can be easily and quickly removed after it has been used.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the device.

Figure 2 is a longitudinal sectional view.

Figure 3 is an enlarged sectional detail view of the lower part of the device.

Figure 4 is a bottom plan view.

Figure 5 is a view of the filter parts.

In these views 1 indicates the container part of the device which is provided with a handle 2 so that the container can be lowered into a receptacle containing the liquid to be tested. The bottom 3 of the container is preferably screw threaded to the body thereof to make a tight joint and said bottom is provided with an outlet opening 4. This opening is normally held closed by a valve plate 5 which is provided with a conical depending part 5' which extends through the opening. This valve device is held in place by a cage 6. A tube 7 is secured to the handle and has its lower end communicating with the top of the container. A bulb 8 is connected with the top of the tube and acts to force the liquid from the container when the bulb is pressed upon. A cock 9 is also connected with the upper end of the tube and this cock is carried by the handle.

A filter cup 10 is adapted to be removably connected with the bottom of the container, over the outlet hole therein by means of the spider 11 having its ends engaging the hooks 12 on the bottom. By giving the spider a turning movement, as shown in full and dotted lines in Figure 4, the spider can be engaged with and disengaged from the hooks. Thus the filter device is easily placed on and removed from the container.

In using the device, the cock is closed to prevent the milk entering the container and then the device is forced through the liquid in the receptacle until the bottom of the container is adjacent the bottom of the receptacle. The cock is then opened to permit the air in the container to escape and allow the liquid to push up the valve and enter the container. Thus a part of the liquid is secured near the bottom of the receptacle which will contain impurities if there are any. The device is then withdrawn from the receptacle, the valve preventing the milk from escaping. The filter is then put in place, and, as will be seen, when this is done the valve will be forced off its seat by the filter engaging the end of the conical extension of the valve. The liquid will then flow from the container through the filter and thus leave the sediment on the filtering medium so that the inspector can tell at once whether or not the milk contains impurities or sediment. The milk can be forced from the container by the bulb. By this invention it is not necessary to test the milk itself as the filter medium will show the sediment if any is contained in the milk. The cock can be closed after the container is filled as this will act to prevent the milk escaping from the outlet as it will form a vacuum in the top of the container.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A testing device of the class described, comprising a container having an outlet opening in its bottom, an upwardly opening valve closing said opening, a handle for the container, a tube connected with the handle and communicating with the top of the container, a cock at the upper end of the tube and a bulb secured to the top of the tube for forcing the milk from the container.

2. A testing device of the class described, comprising a container, a handle therefor, a tube carried by the handle and communicating with the top of the container, means for opening and closing the upper end of the tube, said container having an outlet opening in its bottom, a valve for closing the same, a filtering medium and means for detachably securing the same to the bottom of the container over the outlet opening.

3. A testing device of the class described, comprising a container, a handle therefor, a tube carried by the handle and communicating with the top of the container, means for opening and closing the upper end of the tube, said container having an outlet opening in its bottom, a valve for closing the same, a filtering medium and means for detachably securing the same to the bottom of the container over the outlet opening and means for opening the valve by the placing of the filtering medium in position.

In testimony whereof I affix my signature.

PHILIP V. O'HARA.